United States
Tojyo

[11] 3,966,307
[45] June 29, 1976

[54] TELEPHOTO LENS SYSTEM
[75] Inventor: Tsutomu Tojyo, Hachiouji, Japan
[73] Assignee: Olympus Optical Co., Ltd., Tokyo, Japan
[22] Filed: Oct. 18, 1974
[21] Appl. No.: 516,015

[30] Foreign Application Priority Data
  Oct. 23, 1973  Japan.............................. 48-118527

[52] U.S. Cl. ................................................. 350/216
[51] Int. Cl.$^2$............................................. G02B 9/60
[58] Field of Search............................. 350/216, 220

[56] References Cited
UNITED STATES PATENTS
2,576,436  11/1951  Baker........................ 350/216 X
3,502,394  3/1970  Kobayashi........................ 350/216

*Primary Examiner*—John K. Corbin
*Assistant Examiner*—Conrad Clark
*Attorney, Agent, or Firm*—Cushman, Darby & Cushman

[57] ABSTRACT

A telephoto lens system comprising a front lens group having a strong positive power and a rear lens group having a strong negative power and satisfying the following conditions, said telephoto lens system thus having a small telephoto ratio and aberrations corrected quite favorably.

1. $0.32f < d_6 < 0.40f$
2. $1.25f < r_2$
3. $|1/r_6| < 0.2/f$
4. $0.3 < -r_3/r_4 < 0.9$
5. $0.9 < r_1/r_5 < 1.1$
6. $0.008f < d_2 + d_4 < 0.015f$
7. $n_1, n_3 < 1.55, n_2 > 1.7$
8. $|\nu_1 - \nu_2| > 35, |\nu_3 - \nu_2| > 30$

2 Claims, 7 Drawing Figures

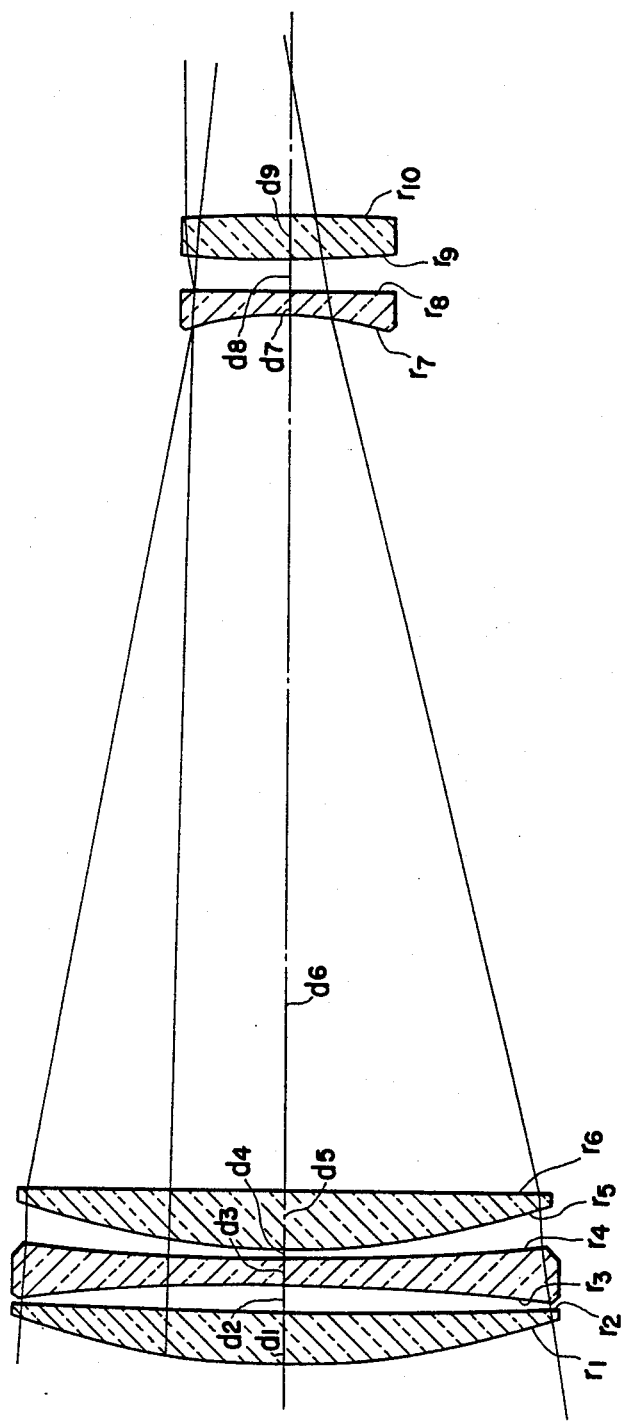

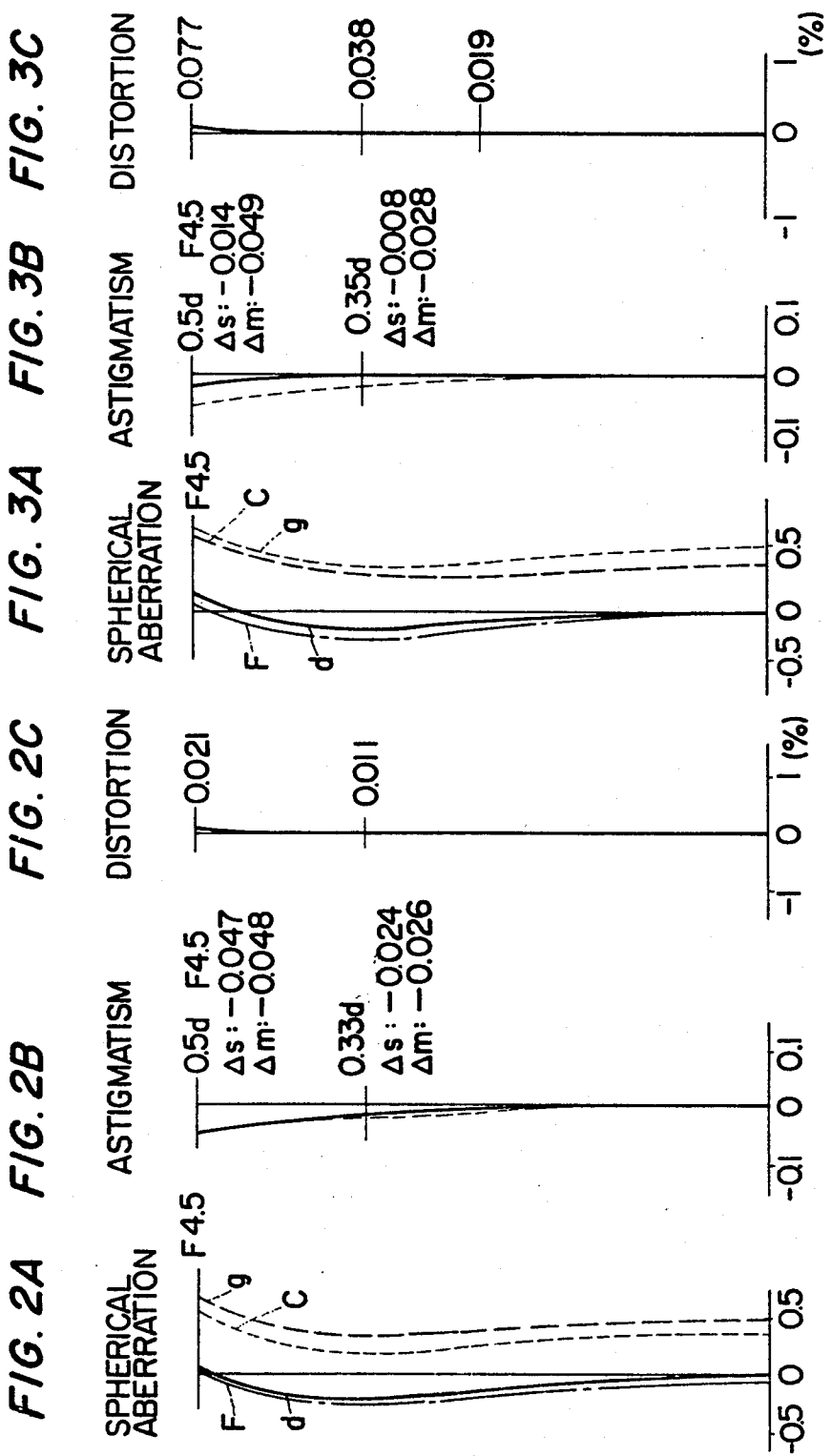

TELEPHOTO LENS SYSTEM

BACKGROUND OF THE INVENTION a. Field of the Invention:

The present invention relates to a telephoto lens system and, more particularly, to a telephoto lens system arranged to obtain a telephoto ratio of 0.83 or less without using special material such as fluorite.

b. Description of the Prior Art:

For telephoto lens systems, it is generally desirable that the distance from the first lens surface of the lens system to the focal plane is short. That is, when the telephoto ratio, which is the ratio of the distance from the first lens surface to the focal plane and the focal length of the lens system as a whole, is smaller, it is more desirable as the lens system as a whole can be made more compact and it is more convenient for operation. To make said telephoto ratio small for the above-mentioned purpose, it is preferable to make the positive power of the front lens group large and to make the negative power of the rear lens group also large. For such lens system, however, distribution of power becomes unbalanced and, consequently, it becomes difficult to correct aberrations favourably. Therefore, the requirement to make the telephoto ratio small and the requirement to favourably correct aberrations are contradictory to each other. As a means to meet both of such requirements, which are contradictory to each other, some of known telephoto lens system employ a lens for which special material such as fluorite is used. In practice, however, it is not desirable to use such special material.

SUMMARY OF THE INVENTION

It is, therefore, a primary object of the present invention to provide a telephoto lens system for which the telephoto ratio is made extremely small by adequate power distribution without using a special material such as fluorite and, at the same time, for which aberrations are corrected quite favourably.

The telephoto lens system according to the present invention is arranged by a front lens group comprising three lenses and a rear lens group comprising two lenses and by providing a large airspace between said front and rear lens groups. In said front lens group of the lens system according to the present invention, a first lens is a positive meniscus lens with its convex surface positioned on the object side, a second lens is a biconcave lens and a third lens is a positive lens with its convex surface positioned on the object side. In said rear lens group, a fourth lens is a negative lens with its concave surface positioned on the object side and a fifth lens is a biconvex lens. Besides, the lens system according to the present invention satisfies the following conditions when reference symbol $f$ represents a focal length of the lens system as a whole, reference symbol $d_6$ represents an airspace between the front and rear lens groups, reference symbols $r_1$ and $r_2$ respectively represent radii of curvature of both surfaces of the first lens, reference symbols $r_3$ and $r_4$ respectively represent radii of curvature of both surfaces of the second lens, reference symbols $r_5$ and $r_6$ respectively represent radii of curvature of the third lens, reference symbol $d_2$ represents an airspace between the first and second lenses, reference symbol $d_4$ represents an airspace between the second and third lenses, reference symbols $n_1$, $n_2$ and $n_3$ respectively represent refractive indexes of the first, second and third lenses, and reference symbols $\nu_1$, $\nu_2$, and $\nu_3$ respectively represent Abbe's numbers of said respective lenses.

1. $0.32f < d_6 < 0.40f$
2. $1.25f < r_2$
3. $|1/r_6| < 0.2/f$
4. $0.3 < -r_3/r_4 < 0.9$
5. $0.9 < r_1/r_5 < 1.1$
6. $0.008f < d_2 + d_4 < 0.015f$
7. $n_1, n_3 < 1.55, n_2 > 1.7$
8. $|\nu_1 - \nu_2| > 35, |\nu_3 - \nu_2| > 30$

Purposes of the above conditions are as explained below. The condition (1) defines the airspace between the front and rear lens groups and is to prevent aggravation of coma and astigmatism when the telephoto ratio is made small. If $d_6$ in the condition (1) becomes smaller than the lower limit, i.e., if $d_6 < 0.32f$, it becomes difficult to make the telephoto ratio small and, moreover, it becomes difficult to correct coma favourably. If $d_6$ exceeds the upper limit, i.e., if $d_6 > 0.40f$, it may be advantageous to make the telephoto ratio small. However, Petzval's sum becomes large and it becomes difficult to favourably correct astigmatism. Therefore, aberrations will become considerably unbalanced. Moreover, it becomes difficult to favourably correct aberrations when intensity of light at the marginal portion is made large.

The condition (2) is to define the radius of curvature of the rear surface of the first lens. If it becomes $r_2 < 1.25f$, overcorrection of spherical aberration occurs. Especially, if $r_2$ becomes a negative value and the first lens, i.e., the lens closest to the object becomes a biconvex lens, correction of astigmatism becomes very difficult.

The condition (3) is related with the radius of curvature $r_6$ of the rear surface of the third lens. When it becomes $1/r_6 > (0.2/f)$ in this condition, it may be advantageous for making the telephoto ratio small. However, it is not desirable for favourably correcting various aberrations. In case of $1/r_6 < - (0.2/f)$, it is advantageous for correction of aberrations. However, it becomes impossible to make the telephoto ratio small enough to attain the object of the present invention.

The condition (4) is for making the number of lenses which constitute the lens system as a whole small and for favourable correction of coma and sine condition. If it becomes $-(r_3/r_4) < 0.3$ in this condition, it becomes difficult to favourably correct coma caused by rays which are incident at greater distances from the optical axis. When it becomes $-(r_3/r_4) > 0.9$, it is necessary, for favourable correction of the sine condition, to correct it by surfaces of the third, fourth and fifth lenses. Therefore, when the third lens is arranged as a single lens as in the case of the lens system according to the present invention, the sine condition cannot be corrected favourably.

The condition (5) is to correct spherical aberration favourably. If $r_1/r_5$ is not within the range defined by this condition, zonal spherical aberration aggravates and it becomes very difficult to correct it favourably.

The condition (6) is to define airspaces between respective lenses in the front lens group. If the sum of both airspaces, i.e., $d_2 + d_4$ becomes $d_2 + d_4 > 0.015f$, correction of spherical aberration becomes insufficient. If, on the contrary, it becomes $d_2 + d_4 < 0.008f$, respective airspaces between lenses become very small and respective lenses will contact each other. Therefore, it becomes very difficult to assemble the lens system at the time of manufacture.

Conditions (7) and (8) are for correction of coma, Petzval's sum and chromatic aberration. Especially, the condition (7) is established in order to correct coma favourably and to prevent increase of Petzval's sum. The condition (8) is established to make the secondary spectrum small which decreases the resolving power at the central portion in case of telephoto lens systems. That is, in the telephoto lens system according to the present invention, differences of dispersions of respective positive lenses and dispersion of the negative lens in the front lens group are made large in order to make the secondary spectrum small and, consequently, to improve the resolving power at the central portion. Besides, by using glass material of low refractive index and low dispersion for the first lens, as shown by conditions (7) and (8) chromatic aberration in the front lens group is prevented from becoming large.

BRIEF EXPLANATION OF THE DRAWINGS

FIG. 1 shows a sectional view of a preferred embodiment of the telephoto lens system according to the present invention; and FIGS. 2A, 2B and 2C and FIGS. 3A, 3B and 3C respectively show graphs illustrating aberration curves of respective embodiments of the telephoto lens system according to the present invention.

DETAILED DESCRIPTION OF THE PREFERRED EMBODIMENTS

Preferred embodiments of the lens system according to the present invention explained in the above are as shown below.

Embodiment 1

$r_1 = 0.3186$
  $d_1 = 0.0225$   $n_1 = 1.48749$   $\nu_1 = 70.1$
$r_2 = 2.8394$
  $d_2 = 0.0112$
$r_3 = -0.9987$
  $d_3 = 0.0110$   $n_2 = 1.7400$   $\nu_2 = 31.7$
$r_4 = 1.2312$
  $d_4 = 0.0020$
$r_5 = 0.3283$
  $d_5 = 0.0230$   $n_3 = 1.52542$   $\nu_3 = 64.5$
$r_6 = \infty$
  $d_6 = 0.3649$
$r_7 = -0.1408$
  $d_7 = 0.0100$   $n_4 = 1.51874$   $\nu_4 = 64.5$
$r_8 = \infty$
  $d_8 = 0.0140$
$r_9 = 0.6388$
  $d_9 = 0.0200$   $n_5 = 1.57309$   $\nu_5 = 42.6$
$r_{10} = -0.4795$
  $f = 1.0$   $f_B = 0.3412$   $P = 0.82$
  $1 : 4.5$ Embodiment 2

$r_1 = 0.3224$
  $d_1 = 0.0208$   $n_1 = 1.48749$   $\nu_1 = 70.2$
$r_2 = 1.3884$
  $d_2 = 0.0105$
$r_3 = -0.9223$
  $d_3 = 0.0110$   $n_2 = 1.74000$   $\nu_2 = 28.3$
$r_4 = 2.6366$
  $d_4 = 0.0020$
$r_5 = 0.3329$
  $d_5 = 0.0230$   $n_3 = 1.51821$   $\nu_3 = 65.0$
$r_6 = \infty$
  $d_6 = 0.3625$
$r_7 = -0.1406$
  $d_7 = 0.0100$   $n_4 = 1.49782$   $\nu_4 = 66.8$
$r_8 = \infty$
  $d_8 = 0.0140$
$r_9 = 0.7064$
  $d_9 = 0.0250$   $n_5 = 1.57309$   $\nu_5 = 42.6$ -continued $r_{10} = -0.5568$
  $f = 1.0$   $f_B = 0.3329$   $P = 0.81$
  $1 : 4.5$ In the above, reference symbol $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indexes of respective lenses, reference symbols $\nu_1$ through $\nu_5$ respectively represent Abbe's numbers of respective lenses, reference symbol $f$ represents the focal length of the lens system as a whole, reference symbol $f_B$ represents the back focal length, and reference symbol P represents the telephoto ratio.

Graphs illustrating aberration curves of the embodiment 1 are shown in FIGS. 2A, 2B and 2C. Graphs illustrating aberration curves of the embodiment 2 are shown in FIGS. 3A, 3B and 3C. Said graphs are drawn on the basis of the focal length of 400.

I claim:

1. A telephoto lens system comprising five lenses, a first lens being a positive meniscus lens with its convex surface positioned on the object side, a second lens being a biconcave lens, a third lens being a positive meniscus lens with its convex surface positioned on the object side, a fourth lens being a negative lens with its concave surface positioned on the object side, and a fifth lens being a biconvex lens, and said telephoto lens system having the following numerical values:

$r_1 = 0.3186$
  $d_1 = 0.0225$   $n_1 = 1.48749$   $\nu_1 = 70.1$
$r_2 = 2.8394$
  $d_2 = 0.0112$
$r_3 = -0.9987$
  $d_3 = 0.0110$   $n_2 = 1.7400$   $\nu_2 = 31.7$
$r_4 = 1.2312$
  $d_4 = 0.0020$
$r_5 = 0.3283$
  $d_5 = 0.0230$   $n_3 = 1.52542$   $\nu_3 = 64.5$
$r_6 = \infty$
  $d_6 = 0.3649$
$r_7 = -0.1408$
  $d_7 = 0.0100$   $n_4 = 1.51874$   $\nu_4 = 64.5$
$r_8 = \infty$
  $d_8 = 0.0140$
$r_9 = 0.6388$
  $d_9 = 0.0200$   $n_5 = 1.57309$   $\nu_5 = 42.6$
$r_{10} = -0.4795$
  $f = 1.0$   $f_B = 0.3413$   $P = 0.82$
  $1 : 4.5$ wherein reference symbol $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indexes of respective lenses, reference symbols $\nu_1$ through $\nu_5$ respectively represent Abbe's numbers of respective lenses, reference symbol $f$ represents the focal length of the lens system as a whole, reference symbol $f_B$ represents the back focal length, and reference symbol P represents the telephoto ratio.

2. A telephoto lens system comprising five lenses, a first lens being a positive meniscus lens with its convex surface positioned on the object side, a second lens being a biconcave lens, a third lens being a positive meniscus lens with its convex surface positioned on the object side, a fourth lens being a negative lens with its concave surface positioned on the object side, and a fifth lens being a biconvex lens, and said telephoto lens system having the following numerical values:

$r_1 = 0.3224$
$\quad d_1 = 0.0208 \quad n_1 = 1.48749 \quad \nu_1 = 70.2$
$r_2 = 1.3884$
$\quad d_2 = 0.0105$
$r_3 = -0.9223$
$\quad d_3 = 0.0110 \quad n_2 = 1.74000 \quad \nu_2 = 28.3$
$r_4 = 2.6366$
$\quad d_4 = 0.0020$
$r_5 = 0.3329$
$\quad d_5 = 0.0230 \quad n_3 = 1.51821 \quad \nu_3 = 65.0$
$r_6 = \infty$
$\quad d_6 = 0.3625$
$r_7 = -0.1406$
$\quad d_7 = 0.0100 \quad n_4 = 1.49782 \quad \nu_4 = 66.8$
$r_8 = \infty$
$\quad d_8 = 0.0140$
$r_9 = 0.7064$
$\quad d_9 = 0.0250 \quad n_5 = 1.57309 \quad \nu_5 = 42.6$ $r_{10} = -0.5568$
$f = 1.0 \qquad f_B = 0.3329 \qquad P = 0.81$
$1 : 4.5$ wherein reference symbol $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indexes of respective lenses, reference symbols $\nu_1$ through $\nu_5$ respectively represent Abbe's numbers of respective lenses, reference symbol $f$ represents the focal length of the lens system as a whole, reference symbol $f_B$ represents the back focal length, and reference symbol P represents the telephoto ratio.

* * * * *